United States Patent
Droke et al.

[15] 3,669,921
[45] June 13, 1972

[54] COPOLYESTER MELT ADHESIVE

[72] Inventors: Joseph W. Droke; James E. Hataway; Nicholas C. Russin, all of Kingsport, Tenn.

[73] Assignee: Eastman Kodak Company, Rochester, N.Y.

[22] Filed: Feb. 8, 1971

[21] Appl. No.: 113,595

Related U.S. Application Data

[63] Continuation-in-part of Ser. No. 845,554, July 28, 1969, abandoned, which is a continuation-in-part of Ser. No. 725,938, May 1, 1968, abandoned.

[52] U.S. Cl. ..........................................260/40 R, 260/75 R
[51] Int. Cl. ..............................................C08k 1/02
[58] Field of Search .......................260/40 R, 75 R

[56] References Cited

UNITED STATES PATENTS

| | | | |
|---|---|---|---|
| 3,136,677 | 6/1964 | Woker | 260/75 R X |
| 3,170,833 | 2/1965 | Noyes | 260/75 EP X |
| 3,372,148 | 3/1968 | Wiener | 260/40 R X |

FOREIGN PATENTS OR APPLICATIONS

| | | | |
|---|---|---|---|
| 1,047,072 | 11/1966 | Great Britain | 260/75 R |

*Primary Examiner*—Morris Liebman
*Assistant Examiner*—S. M. Person
*Attorney*—Cecil D. Quillen, Jr. and Charles L. Good

[57] ABSTRACT

Copolyesters useful as melt adhesives in the bonding of fabrics, metal, glass, wood, rubber, plastic sheets and other products to produce a bond which will resist the action of heat, steam, dry cleaning solvents and the like, said copolyester being derived from (1) terephthalic acid, (2) adipic acid, (3) ethylene glycol, and (4) 1,4-butanediol or derivatives of these four components. These copolyesters are advantageously improved by the incorporation therein of specific amounts of either sodium stearate or titanium dioxide.

21 Claims, No Drawings

COPOLYESTER MELT ADHESIVE

This application is a continuation-in-part of application, Ser. No. 845,554, filed July 28, 1969, entitled COPOLYESTER MELT ADHESIVE, which is a continuation-in-part of copending application, Ser. No. 725,938, filed May 1, 1968, entitled COPOLYESTERS AS HOT MELT ADHESIVES, both now abandoned.

This invention relates to copolyesters useful as hot melt adhesives. More specifically, this invention relates to copolyester melt adhesives derived from (1) terephthalic acid, (2) adipic acid, (3) ethylene glycol and (4) 1,4-butanediol or derivatives of these four components. In one of its more specific aspects, this invention relates to copolyester melt adhesives derived from the above four components and containing specific amounts of an additive selected from titanium dioxide and sodium stearate.

In providing decorative trim for upholstered items, draperies, and similar objects, it has been the customary practice to sew or stitch the trim to the material to be decorated. This method has in many cases led to undesirable results, such as buckling and loss of thread strength. Various copolyester adhesives have been tried as a substitute for sewing and have shown some promise. However, hitherto known adhesives have not been satisfactory because they were either lacking in the ability to simultaneously bond fabrics and resist the action of dry cleaning or other solvents with which the bonded product may later be treated, or they did not exhibit the necessary adhesivity to merit their use in fabric applications (See U.S. Pat. 3,136,677). Similar problems have been encountered in the manufacture and use of other laminated products such as glass, wood, rubber, plastic sheeting and the like. Some of the problems presented by failure of the adhesive to resist the action of heat, steam, solvents and the like have been found to be particularly acute in the aircraft industry.

The copolyesters of this invention have a high degree of effectiveness in solving these problems. They provide excellent adhesion to a wide variety of fibrous substrates and are particularly effective in resisting extended contact with dry cleaning and other solvents. Inasmuch as fabric joining applications, until recently, have been limited by the speed of sewing equipment, the copolyester adhesives of this invention permit substantially increased production rates in applications such as hemming sheets and pillowcases and attaching labels to garments.

In another aspect of this invention it has unexpectedly been discovered that the incorporation of specific amounts of either titanium dioxide or sodium stearate into the aforementioned copolyester adhesives has the beneficial effect of preventing loss of bond strength due to aging. This discovery further improves the copolyester adhesive in that the life of the adhesive is surprisingly extended.

It is, therefore, a principal object of the present invention to provide hot melt adhesives which may be employed for the successful lamination or bonding of a wide variety of domestic, industrial and other fabrics, as well as the bonding of various other substrates such as metal, wood, rubber, plastic sheeting, glass and other materials, either to themselves or to other materials.

A further object is to provide a hot melt adhesive composed of a specific copolyester composition which will have a sufficiently low softening temperature as to enable it to be readily employed in laminating and other bonding operations, but yet not sufficiently low to cause degeneration (let goes) or weakening of the adhesive bond under conditions of use or maintenance.

A still further object is to provide a copolyester hot melt adhesive which will not only function satisfactorily in the bonding of fabric, but also will provide a bond in the finished product which will resist the action of dry cleaning solvents and will be sufficiently flexible to enable the bonded fabric to flex or bend in its normal use without cracking or let goes in the bonding layer.

Another object is to provide a copolyester hot melt adhesive derived from (1) terephthalic acid, (2) adipic acid, (3) ethylene glycol and (4) 1,4-butanediol or derivatives of these four components which is specifically adapted for use in the bonding of fabric and other substrates.

A still further object of this invention is to provide a copolyester hot melt adhesive derived from the four above-mentioned components which exhibits improved physical properties upon the addition of specific amounts of an additive selected from titanium dioxide and sodium stearate.

Other objects are apparent elsewhere in this specification.

According to one aspect of this invention there is provided a hot melt adhesive composition comprising a copolyester of components (1), (2), (3) and (4) as follows:

1. terephthalic acid or derivatives thereof;
2. adipic acid or derivatives thereof;
3. ethylene glycol or derivatives thereof; and
4. 1,4-butanediol or derivatives thereof, wherein the acid components and the diol components are present in a 1:1 molar ratio, said copolyester having a mole ratio of terephthalic acid to adipic acid within the range of about 60:40 to about 80:20, a mole ratio of ethylene glycol to 1,4-butanediol within the range of about 60:40 to about 80:20, a softening point within the range of about 80°–160° C., and an inherent viscosity of at least 0.5 as measured at 25° C. using 0.25 grams of copolyester per 100 ml. of a solvent consisting of 60 percent by weight phenol and 40 percent by weight tetrachloroethane.

In an especially preferred embodiment of the invention there is provided a hot melt adhesive composition comprising the copolyester defined above except that the mole ratios of terephthalic acid to adipic acid is about 75:25, the mole ratio of ethylene glycol to 1,4-butanediol is about 75:25, the softening point is within the range of about 90°–150° C., and the inherent viscosity is at least 0.7, preferably about 0.85.

In a more specific aspect of this invention there is provided a hot melt adhesive composition of the four above-mentioned components containing about 0.10–2.0 weight percent, based on the weight of the copolyester, of an additive selected from the group consisting of titanium dioxide and sodium stearate. It has been found that the addition of titanium dioxide or sodium stearate into the copolyesters of this invention significantly reduces loss of bond strength due to aging.

The copolyesters of this invention may be prepared by standard procedures well known to those skilled in the art. See, for example, British Pat. No. 1,047,072. For example, these copolyesters may be prepared by employing such amounts of terephthalic acid, adipic acid, ethylene glycol and 1,4-butanediol according to such polymerization conditions as will result in the production of a copolyester in which the mole ratio of terephthalic acid to adipic acid will be within the range of 60:40 to 80:20, the range of ethylene glycol to 1,4-butanediol will be in the range of 60:40 to 80:20, and the inherent viscosity (I.V.) will be greater than 0.5, preferably 0.7. It has been found that the higher the I.V. of the copolyester material, the greater bond strength will be resulting from its use in laminating fabrics and other substrates, as revealed by the so-called "Peel-Test", the details of which are described hereinafter. In general, the copolyesters of this invention in which the mole ratios of terephthalic acid to adipic acid are within the range of 60:40 to 80:20 and ethylene glycol to 1,4-butanediol within the range of 60:40 to 80:20 are characterized by softening points ranging from about 80° C. to about 158° C., e.g., 160° C.

The mole ratio of terephthalic acid to adipic acid, ethylene glycol to 1,4-butanediol, the softening temperature and the I.V. of several typical compositions are listed in the following tabulation:

Mole Percent of Acid and Glycol Components

| Copolyester | Terephthalic Acid/Adipic Acid | Ethylene Glycol/1,4-Butanediol | Softening Point, °C. | I.V. |
| --- | --- | --- | --- | --- |
| 1 | 60:40 | 60:40 | 80–85 | 1.27 |

| 2 | 70:30 | 70:30 | 130–135 | 1.09 |
| 3 | 80:20 | 80:20 | 153–158 | 1.16 |

Softening Point Test

This test is carried out to determine the temperature at which any given copolyester composition, applied as a bonding agent between two substrates, softens sufficiently to allow the substrates to be pulled apart when one of the substrates is fixed and a given weight is attached to the other. This test is essentially the same as the so-called "Peel Test" described in detail hereinafter, except that the temperature is elevated at a programmed rate.

While we have referred to terephthalic acid and adipic acid, derivatives of such acids can be employed, if desired. Examples of such derivatives are the acids, anhydrides, esters and acid chlorides of such acids, For example, dimethyl terephthalate may be employed in place of terephthalic acid and dimethyl adipate can be used in place of adipic acid. In a similar manner, derivatives of ethylene glycol and 1,4-butanediol may be advantageously employed. Another method is to prepare a diester of the adipic acid and the 1,4-butanediol and then mix the diesters with poly(ethylene terephthalate). This mixture is then melted and polymerized at 250°–280° C. under reduced pressure until the inherent viscosity of the polymer product is at least 0.5 as measured at 25° C. in a solution containing about 0.25 gram of polymer in 100 ml. of a solvent composed of 60 percent phenol and 40 percent tetrachloroethane. In accordance with our invention, the polymerization is carried out under such conditions that the resulting copolyester will have a range of mole ratios of terephthalic acid to adipic acid from 60:40 to 80:20, a range of mole ratios of ethylene glycol to 1,4-butanediol from 60:40 to 80:20, and an I.V. greater than about 0.5. In a more specific aspect of this invention, titanium dioxide may be introduced by copolymerizing the adipic acid and the 1,4-butanediol with waste poly(ethylene terephthalate) containing such an additive or alternatively sodium stearate or titanium dioxide may be introduced into the polymerization mixture in which the copolyester is produced.

If desired, dyes or dye-receptive agents, color stabilizers, and various other adjuvants may be added to the copolyester adhesives of our invention to meet certain specific use requirements. Such additives would normally be added, as such, to the polymerization mixture in which the copolyester is produced.

As indicated above, when copolyesters prepared as described above are employed as melt adhesives to laminate various fabric systems, metal strips and the like, excellent bonds result. These bonds are found to be highly resistant to the action of dry cleaning solvents such as perchloroethylene. The strength of the bonds is determined by the so-called "Peel Test" based on a modification of the ASTM "T-Peel Test" set forth on pages 63 and 64 of the 1964 edition of the BOOK OF ASTM STANDARDS, published by the American Society for Testing Materials, and more specifically identified as Test Number D–1876–61–T.

The test for determining the strength of bonds between fabric systems is carried out as follows:

T-PEEL TEST (FABRICS)

Preparation of Test Samples

Three sets of two woven fabrics are prepared, each strip being 6 inches long, 1 inch wide and 0.012 inch thick. A 1 inch square film of the copolyester adhesive with a thickness of 0.004 inch is placed between the two woven fabrics, leaving 5 inches of exposed unbonded fabric. The fabric specimens with the film in between are pressed together at a temperature of 196° C. and a pressure of 30 pounds for 2 seconds. The heat and pressure causes the copolyester adhesive to melt and wet the surface of the fabric. The bonded specimens are then allowed to cool to ambient conditions for 24 hours before testing.

Bond Strength Test

The laminated fabric specimens prepared as described above are then subjected to a peel test to determine the quantity of force required to separate the adherent materials from each other. The unbonded ends of the laminated strip are placed in the jaws of an Instron testing machine and the laminated strip is pulled apart at a jaw separation rate of 2 inches per minute. Each of the three laminated strips is tested in this manner and the force in pounds required to pull the strips apart is recorded for each strip and averaged for the three tests.

The test for determining the strength of bonds between metal substrates, as for example aluminum, and between other substrates, is carried out as indicated in the following typical procedure.

T-PEEL TEST (METAL STRIPS)

Preparation of Test Sample

Three sets of two aluminum strips are prepared, each strip being 6 inches long, 1 inch wide and 0.012 inch thick and polished on one surface. These strips are cleaned with an appropriate solvent, such as acetone, and dried. One strip of each set is coated along 2 inches of its length in the following manner with the copolyester material under test, leaving 4 inches of the strip uncoated. Pellets of the copolyester adhesive are distributed evenly over the polished surface of one of the metal strips in each set, the strip bearing the pelleted material then placed on a hot plate and heated to a temperature sufficient to melt the copolyester material, as for example, about 135° C. This temperature occasions flowing of the copolyester material which is thus evenly distributed to form a homogeneous layer a few thousandths of an inch thick. The coated strip is then cooled, another uncoated strip of the same dimensions is superimposed on the adhesive layer of the coated strip with the polished side in contact with the adhesive and the resulting assembly placed on a hot plate and the assembly heated to about 135° C. While the assembly is still on the hot plate, moderate pressure is applied to the upper metal strip, thus spreading the adhesive material between the strips to a uniform thickness of about 0.008 inch.

Bond Strength Test

The laminated products thus produced are then each subjected to a peel test to determine the amount of force required to separate the adhered metal strips one from another. The test strip (6 inches long, 1 inch wide and 0.012 inch thick and laminated by means of the copolyester adhesive along 2 inches of its length) is conditioned for 24 hours at about 73° F. and 50 percent relative humidity.

The uncoated ends of the laminated strip thus produced are placed in the jaws of an Instron testing machine and the laminated strip is pulled apart at a jaw separation rate of 10 inches per minute. Each of the three laminated strips is tested in this manner and the force in pounds required to pull the strip apart is recorded for each sample and averaged for the three tests.

The above described copolyesters are especially useful as melt adhesives in bonding fabrics of natural and manmade fibers such as those produced from polyesters, rayon, cellulose acetate and cotton, as well as in bonding of other laminated products. As indicated above, these copolyesters are particularly characterized by their ability to withstand the action of heat, steam and dry cleaning liquids, such as hot perchloroethylene.

Although the procedures employed for the lamination or bonding of fabrics, metals and other substrates and the methods of testing bond strengths are in general well known to those skilled in the art, the following examples are included for a better understanding of the invention.

EXAMPLE 1

One thousand four hundred sixty grams (10 moles) of adipic acid; 1,800 grams (20 moles) of 1,4-butanediol; and 150 to 200 ppm titanium as titanium tetraisopropoxie are reacted for 90 minutes, and the water formed during esterification is removed by distillation. The temperature of the reacting mixture ranges from 164° C. (at the start of the esterification reaction) to 260° C. (at the completion of the esterification reaction). The product of this reaction, bis-4-hydroxybutyl adipate, is mixed with poly(ethylene terephthalate) polymer with an inherent viscosity of 0.62 to 0.64 in a ratio such that the mole percent of terephthalic acid to adipic acid is 60:40. The mixture is melted at a temperature of 260° C. and polymerized under reduced pressure (0.10 to 0.50 mm. Hg) for 60 minutes or until a high melt viscosity is obtained as measured by the load on the stirrer. The product is cooled under vacuum at room temperature. The copolyester has an inherent viscosity of 0.84 and a softening point of about 80° C.

When the copolyester adhesive prepared as described in this Example 1 is employed to bond the fabric systems indicated below and these are tested for resistance to the action of hot perchloroethylene, the following results are obtained.

| T-Peel Test of Fabric System | Before Dry Cleaning with Perchloroethylene | After Dry Cleaning |
|---|---|---|
| Two pieces of fabric woven from a blend of rayon and cotton | 4.3 lbs. | 3.5 lbs. |
| Two pieces of 100% cellulose acetate woven fabric | 10.2 lbs. | 10.2 lbs. |

When thin aluminum strips 6 inches long, 1 inch wide and 0.012 inch thick are bonded with the copolyester adhesive prepared as described in this Example 1, and tested for bond strength, the following results are obtained:

Aluminum Strips Subject to T-Peel Test

| Average T-Peel Test at 0°C. | Average T-Peel Test at 25°C. |
|---|---|
| 9.1 lbs. | 13.1 lbs. |

EXAMPLE 2

A copolyester adhesive composition is prepared by substantially the same procedure as employed in preparation of the copolyester of Example 1, except that the poly(ethylene terephthalate) component of the reaction mixture is employed in the form of waste yarn. The final copolyester product is employed to produce excellent bonds between the laminae of the respective fabric systems of Example 1. When thin aluminum sheets as described above are bonded together with this copolyester adhesive under heat and pressure and subjected to the T-Peel Test, at 0° C., a force of 9.7 lbs. is required to separate the layers. At 25° C., 16.3 lbs. of force is required.

EXAMPLE 3

A copolyester adhesive composition similar to that described in Example 1 is prepared except that the bis-4-hydroxybutyl adipate is reacted with bis-2-hydroxyethyl terephthalate instead of poly(ethylene terephthalate) in a ratio such that the mole ratio of terephthalic acid to adipic acid is 60:40. The finished copolyester thus obtained is employed as an adhesive to bond the laminae of the fabric systems of Example 1, and excellent bond strength and resistance to the reaction of perchloroethylene is obtained. The material is also employed as an adhesive to bond aluminum strips of the type referred to in Example 1, and the bonded strips are subjected to the T-Peel Test. A force of 15.3 lbs. is required to separate the strip at 0° C. and 17.8 lbs at 25° C.

EXAMPLE 4

A copolyester adhesive composition is prepared by substantially the same procedure as employed in preparation of the copolyester of Example 1 except that the mole ratio of terephthalic acid to adipic acid is about 75:25 and the mole ratio of ethylene glycol to 1,4-butanediol is about 75:25. The copolyester has an inherent viscosity of 0.85 and a softening point of about 140° C.

The copolyester adhesive prepared in this Example 4 is employed to bond the fabric systems indicated below. These samples are commercially laundered and dry cleaned. Peel strength data are given in Table I.

TABLE I

Peel Strength—Polyester-Cotton/Polyester-Cotton

| After Commercial Dry Cleaning With Perchloroethylene | Peel Strength |
|---|---|
| 0 cycles | 24 |
| 5 cycles | 19 |
| 20 cycles | 18 |
| 40 cycles | 18 |
| 60 cycles | 20 |
| After Commercial Laundering | Peel Strength |
| 0 cycles | 24 |
| 5 cycles | 17 |
| 20 cycles | 14 |

When six commercially available fabrics were bonded with the copolyester adhesive prepared as described in this Example 4 and tested for bond strength, the following results are obtained. Peel strength is determined after 1 day, 3 months, and 6 months.

TABLE II

Peel Strength—Various Fabrics Bonded

| | After Time at Ambient Temp. (73°F; 23°C.) Peel Strength (avg. 3 tests) lb/in. | | |
|---|---|---|---|
| | 1 day | 3 months | 6 months |
| Polyester fiber/Cotton-Polyester fiber/Cotton | 19 | 13 | 13 |
| Cotton-Cotton | 20 | 14 | 13 |
| Polyester fiber-Polyester fiber | 22 | 15 | 16 |
| Acetate fiber-Acetate fiber | 9 | 5 | 5 |
| Nylon-Nylon | 11 | 5 | 5 |
| Rayon-Rayon | 19 | 13 | 12 |

When thin metal specimens are bonded with the copolyester adhesive prepared as described in this Example 4, and tested for bond strength, the following results are obtained.

TABLE III

Shear Strength[a] and T-Peel Strength[b]—Metals Bonded

| Conditions | Shear Strength (avg 3 tests), psi. | |
|---|---|---|
| | Aluminum (Al)-Aluminum (Al) | Steel-Steel |
| Ambient Temp. (23° C.) | | |
| 1 Day | 1490 | 1740 |
| 3 Months | 1112 | 2350 |
| 6 Months | 1200 | 1950 |
| | T-Peel Strength (avg 3 tests), lb/in. | |
| Ambient Temp (23° C.) | 24.5 | 39 |

[a]ASTM D 1002–64 Test Method
[b]ASTM D 1876–61T Test Method

EXAMPLE 5

A copolyester adhesive composition similar to that described in Example 1, and having an inherent viscosity of 0.96, is prepared by the same procedure as employed in that example, except that the poly(ethylene terephthalate) component contains titanium dioxide in concentrations not exceeding 2 percent by weight, based on the weight of the copolyester. When this adhesive is employed as a bonding agent to bond the laminae of the respective fabric systems of Example 1, excellent bonds are obtained which have a high resistance to the action of perchlorethylene. When the material is employed as an adhesive to bond aluminum strips of the type referred to in Example 1, and the strips are subjected to the T-Peel Test, a force of 8.7 lbs. is required to separate the strip at 0° C. and 20.4 lbs. at 25° C.

EXAMPLE 6

The following table serves to illustrate the unexpected beneficial effect of incorporating titanium dioxide or sodium stearate into the copolyester melt adhesive of this invention to prevent loss of bond strength upon aging.

TABLE IV
Peel-Strength Values of Bonds on Polyester Fiber-Cotton/Polyester Fiber-Cotton Substrates

| Film thickness | Polymer I.V. | Copolyester Composition | Peel strength initial lb./in. | Peel strength after 3 mo., lb./in. |
|---|---|---|---|---|
| 3.5 mils | 0.84 | Copolyester* | 19.0 | 14.0 |
| 3.5 mils | 0.84 | Copolyester + 1% TiO$_2$ | 21.0 | 20.0 |
| 3.5 mils | 0.84 | Copolyester +0.25% TiO$_2$ | 24.0 | 21.0 |
| 3.5 mils | 0.84 | Copolyester +0.5% sodium stearate | 20.0 | 18.0 |

*Copolyester adhesive composition prepared from 75 mole % terephthalic acid, 25 mole % adipic acid, 75 mole % ethylene glycol and 25 mole % 1,4-butanediol.

The following examples in tabulated form will further serve to explain and illustrate our invention. It will be understood that the specific copolyester adhesive compositions identified in this tabulation may be prepared by essentially the same procedure as described in Example 1, or by equivalent procedures well known to those skilled in the art.

| Example | Copolyester adhesive composition prepared from ethylene glycol, 1,4-butanediol, terephthalic acid and adipic acid (films) | Film thickness, mils | Bonding temperature, ° F. | Peel tests on blended polyester fiber/cotton fabrics—peel strength, lb./in. at 2 in./min. | |
|---|---|---|---|---|---|
| | | | | Dry sample | Sample wet with perchloroethylene |
| 7 | 70% terephthalic acid<br>30% adipic acid<br>70% ethylene glycol<br>30% 1,4-butanediol | 1 | 425 | 5.9 | 1.3 |
| 8 | 70% terephthalic acid<br>30% adipic acid<br>70% ethylene glycol<br>30% 1,4-butanediol | 1 | 450 | 4.9 | 4.2 |
| 9 | 70% terephthalic acid<br>30% adipic acid<br>70% ethylene glycol<br>30% 1,4-butanediol | 5–6 | 425 | 11.7 | 8.7 |
| 10 | 70% terephthalic acid<br>30% adipic acid<br>70% ethylene glycol<br>30% 1,4-butanediol | 5–6 | 450 | 14.9 | 11.9 |
| 11 | 80% terephthalic acid<br>20% adipic acid<br>80% ethylene glycol<br>20% 1,4-butanediol | 2–3 | 425 | 9.6 | 7.0 |
| 12 | 80% terephthalic acid<br>20% adipic acid<br>80% ethylene glycol<br>20% 1,4-butanediol | 2–3 | 450 | 11.9 | 8.6 |
| 13 | 80% terephthalic acid<br>20% adipic acid<br>80% ethylene glycol<br>20% 1,4-butanediol | 6–7 | 425 | 18.4 | 9.9 |
| 14 | 80% terephthalic acid<br>20% adipic acid<br>80% ethylene glycol<br>20% 1,4-butanediol | 6–7 | 450 | 22.5 | 10.4 |

EXAMPLE 15

The following table serves to show that the outstanding physical properties (e.g., critical melting point range and high bond strength) of the copolyesters of this invention cannot be attributed to any single component of this composition.

Item B illustrates this invention. Items A, C and D are presented for comparison and show that the properties for Item B are quite unobvious.

TABLE V

| Item | Composition | Melting point, ° C. | Average peel strength, lbs./in. | | |
|---|---|---|---|---|---|
| | | | Steel/steel | Aluminum/aluminum | Polyester fiber-cotton/polyester fiber-cotton |
| A | 90 mole proportions terephthalic acid<br>10 mole proportions isophthalic acid<br>100 mole proportions ethylene glycol | 229 | 3.5 | 3.0 | 9 |
| B | 75 mole proportions terephthalic acid<br>25 mole proportions adipic acid<br>75 mole proportions ethylene glycol<br>25 mole proportions 1,4-butanediol | 125–130 | 25.5 | 19.0 | 21 |
| C | 85 mole proportions terephthalic acid<br>15 mole proportions adipic acid<br>100 mole proportions ethylene glycol | 220 | 2.5 | 3.0 | 8 |
| D | 85 mole proportions terephthalic acid<br>15 mole proportions isophthalic acid<br>100 mole proportions 1,4-butanediol | | 6.9 | 3.8 | 1 |

NOTE.—Bonding temperature for metal substrates is 475° F. Bonding temperature for cloth substrates is 425° F.

It will be evident to those skilled in the art that many different copolyester compositions characterized by mole ratios of terephthalic acid to adipic acid within the range of 60:40 to 80:20, mole ratios of ethylene glycol to 1,4-butanediol within the range of 60:40 to 80:20, and having an I.V. greater than 0.5 and preferably greater than 0.7 may be prepared within the scope of this invention. Such specific compositions can be successfully employed as melt adhesives for the bonding of a wide variety of substrates such as fabric, metal, glass, wood, rubber, plastic sheets and many other materials to produce bonds which will resist the action of heat, steam, dry cleaning solvents and the like under normal conditions of use of such bonded products. In the case of fabrics, the bonds produced by employing the compositions of our invention are also found to be sufficiently flexible to permit bending, flexing and other manipulations of the bonded fabric without cracking, or let goes or similar defects developing in the bonding layer. This property of flexibility makes possible the use of bonded fabrics which have many applications in the aircraft industry and in the manufacture of upholstered products.

The invention has been described in detail with particular reference to preferred embodiments thereof, but it will be understood that variations and modifications can be effected within the spirit and scope of the invention.

We claim:

1. A hot melt adhesive composition comprising a copolyester of components (1), (2), (3) and (4) as follows:
   1. terephthalic acid or derivatives thereof;
   2. adipic acid or derivatives thereof;
   3. ethylene glycol or derivatives thereof; and
   4. 1,4-butanediol or derivatives thereof, wherein the acid components and the diol components are present in a 1:1 molar ratio, said copolyester having a mole ratio of terephthalic acid to adipic acid within the range of about 60:40 to about 80:20, a mole ratio of ethylene glycol to 1,4-butanediol within the range of about 60:40 to about 80:20, a softening point within the range of about 80°–160° C., and an inherent viscosity of at least 0.5 as measured at 25° C. using 0.25 grams of copolyester per 100 ml. of a solvent consisting of 60 percent by weight phenol and 40 percent by weight tetrachloroethane.

2. The composition of claim 1 containing about 0.10–2.0 weight percent based on the weight of the copolyester of an additive selected from the group consisting of titanium dioxide and sodium stearate.

3. The composition of claim 1 bonded to at least one substrate.

4. The composition of claim 2 bonded to at least one substrate.

5. The composition of claim 1 wherein the softening point is within the range of 110°–140° C. and the inherent viscosity is at least 0.7.

6. The composition of claim 1 wherein the mole ratio of terephthalic acid to adipic acid is about 60:40 and the mole ratio of ethylene glycol to 1,4-butanediol is about 60:40.

7. The composition of claim 6 containing about 0.10–2.0 weight percent based on the weight of the copolyester of an additive selected from the group consisting of titanium dioxide and sodium stearate.

8. The composition of claim 6 wherein the softening point is about 130° C. and the inherent viscosity is about 0.8.

9. The composition of claim 7 wherein the softening point is about 130° C. and the inherent viscosity is about 0.8.

10. The composition of claim 6 bonded to at least one substrate.

11. The composition of claim 7 bonded to at least one substrate.

12. The composition of claim 1 in which the mole ratio of terephthalic acid to adipic acid is about 75:25 and the mole ratio of ethylene glycol to 1,4-butanediol is about 75:25.

13. The composition of claim 12 containing about 0.10–2.0 weight percent based on the weight of the copolyester of an additive selected from the group consisting of titanium dioxide and sodium stearate.

14. The composition as defined by claim 12 wherein the softening point is about 140° C. and the inherent viscosity is at least about 0.8.

15. The composition of claim 12 bonded to at least one substrate.

16. The composition of claim 13 bonded to at least one substrate.

17. The composition of claim 1 in which the mole ratio of terephthalic acid to adipic acid is about 80:20 and the mole ratio of ethylene glycol to 1,4-butanediol is about 80:20.

18. The composition of claim 17 containing about 0.10–2.0 weight percent based on the weight of the copolyester of an additive selected from the group consisting of titanium dioxide and sodium stearate.

19. A composition as defined by claim 17 wherein the softening point is about 150° C. and the inherent viscosity is about 1.16.

20. The composition of claim 17 bonded to at least one substrate.

21. The composition of claim 18 bonded to at least one substrate.

* * * * *